Figure 1:
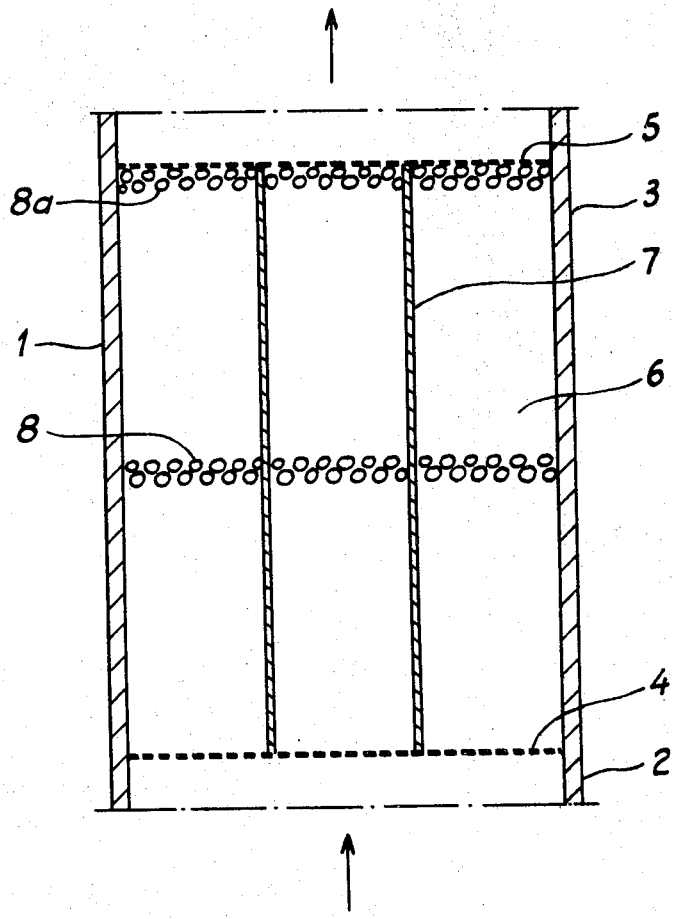

United States Patent [19]
Murkes

[11] 3,902,996
[45] Sept. 2, 1975

[54] COALESCING METHOD

[75] Inventor: Jakob Murkes, Bandhagen, Sweden

[73] Assignee: Alfa-Laval AB, Tumba, Sweden

[22] Filed: Sept. 27, 1973

[21] Appl. No.: 401,231

[30] Foreign Application Priority Data
Oct. 9, 1972 Sweden.............................. 12998/72

[52] U.S. Cl..................................... 210/20; 210/23
[51] Int. Cl.² ........................................ B01D 23/24
[58] Field of Search ........... 210/20, 23, 266, DIG. 5

[56] References Cited
UNITED STATES PATENTS 2,224,624   12/1940   Adams et al................. 210/DIG. 5
3,424,674   1/1969    Webber............................... 210/20

*Primary Examiner*—Frank A. Spear, Jr.
*Attorney, Agent, or Firm*—Cyrus S. Hapgood

[57] ABSTRACT

The disperse phase of an emulsion is coalesced by passing the emulsion through a bed of bodies located between an inlet and an outlet and which are wettable preferentially by the disperse phase. The emulsion is caused to flow through the coalescence bed while allowing mutual movability of the bodies, the entire bed being situated within a space which is completely filled by the flowing emulsion.

1 Claim, 2 Drawing Figures

COALESCING METHOD

The present invention concerns a method for coalescing the disperse phase of an emulsion, the emulsion being passed through a coalescence bed located between an inlet and an outlet for the emulsion and consisting of bodies which are wettable first of all (preferentially) by the disperse phase, for example, bodies of polytetrafluoroethene of polyethene in the case of oil in water.

For coalescing oil droplets such as those in ballast water from ships, use has been made heretofore of beds enclosed between nets and consisting of bodies of a mineral or of plastics. There has been the difficulty that these beds become clogged by sludge particles accompanying the ballast water.

According to the present invention, the risk for this clogging is eliminated or appreciably reduced by causing the emulsion to flow, preferably in vertical direction, through the bed under circumstances which allow mutual movability of the bodies during the flow, in that the whole bed is situated within a space which is completely filled by the flowing emulsion. It is of advantage for the desired movability that the operating conditions be such that the bed is kept close to the outlet by the floating or flow forces. If the flow direction is vertical and the bed is kept close to the outlet by the flow forces, the desired movability is promoted if the specific gravity of the bed bodies is chosen such that the bodies tend to move in a direction opposite to the flow direction of the emulsion.

The invention also comprises apparatus for carrying out the new method and in which the bed is enclosed between two perforate restraining walls, such as nets. The apparatus is characterized in that the space volume enclosed between two end positions for these walls is greater than the volume occupied by the bed bodies in a loosely packed condition. The restraining walls can be movable by the flow forces towards said end positions. However, it is preferred that the restraining walls be stationary. It has been found suitable that the bed bodies, in a loosely packed condition, take at most 75 to 95%, preferably at most 90%, of the space volume limited by said end positions. A suitable size of the bed bodies is about 0.5 to 3 mm. The hole size of the nets or the like should then be only somewhat smaller so as to easily let through passing sludge particles. In order to ensure the desired capability of the bed bodies of easily moving, said bodies should have a specific gravity in the vicinity of that of the emulsion. To this end, a predetermined specific gravity can be imparted to the bodies by means of an inner core of another material, such as metal balls. If the device is utilized in ships, it is possible to counteract the disadvantageous influence of the motion of the sea on the course of coalescence by dividing up the bed by means of mainly vertical walls. It is also possible to arrange similar walls in a stationary plant so as to prevent non-uniform distribution of the bed bodies and possible formation of short-circuit channels in the bed.

Figure 2:
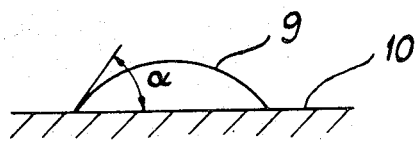

The invention is described more in detail below, reference being made to the accompanying drawing in which;

FIG. 1 schematically shows a vertical section through an embodiment, chosen by way of example, of the present apparatus, and FIG. 2 illustrates an oil droplet attached to a bed body.

In FIG. 1, a vertical tube 1 has a lower end 2 which constitutes the inlet and an upper end 3 which constitutes the outlet for the emulsion to be subjected to coalescence. The emulsion is assumed to be droplets of mineral oil in water. Nets 4 and 5 limit a space 6, which is divided by vertical walls such as concentric tubes. For the sake of simplicity, only one tube 7 is shown. Before any emulsion has been supplied to the device, the bed consisting of small bodies of plastic rests on the lower net 4. The plastic bodies are assumed to have a specific gravity somewhat greater than that of the emulsion. The top layer of the bed is shown in FIG. 1 at 8. When the emulsion is pumped into the lower end of tube 1, the bed 8 is lifted upwards so that it will lie against the upper net 5, the bed bodies moving mutually during the lifting. In the new position of the bed, its upper portion is shown at 8a. Narrow, curved channels develop between the bodies in the bed, and the emulsion now flows through these channels, while oil droplets fasten to the bodies and grow to larger droplets. When these have reached a certain size, they loosen from the bodies and pass upwards through the net 5. Sludge particles accompanying the emulsion are forced forward easily between the bodies, owing to the mutual movability of the latter, and also pass through the net 5. The emulsion thus treated is led further to a separation device (not shown) for separating the oil from the water. When the pumping of emulsion into the tube 1 ends, the bed bodies sink to the net 4; and during their restratification, sludge particles are released which could have remained in the bed. The latter can then be flushed clean with water, which also is pumped in through the inlet 2. Possibly, flushing can also be effected in the opposite direction.

FIG. 2 shows an oil droplet 9 in the emulsion, which droplet has fastened to the surface of a bed body 10. The latter is to be seen as more wettable by oil than by water (i.e., wettable preferentially by the oil), if the contact angle of an oil droplet with the surface of the bed body is less than 90°, the one leg of the contact angle being formed by a tangent to the surface of the oil droplet.

I claim:

1. A method for coalescing the disperse phase of an emulsion, which comprises maintaining between an inlet and an outlet a coalescence bed of bodies which are wettable preferentially by said disperse phase, flowing the emulsion vertically through the bed from said inlet to said outlet while allowing mutual movability of the bodies during the flow, the entire said bed being maintained within a space which is completely filled by the flowing emulsion, and maintaining the bed close to said outlet only by the flowing of the emulsion, the specific gravity of said bed bodies being greater than that of the emulsion.

* * * * *